United States Patent Office 2,885,820
Patented May 12, 1959

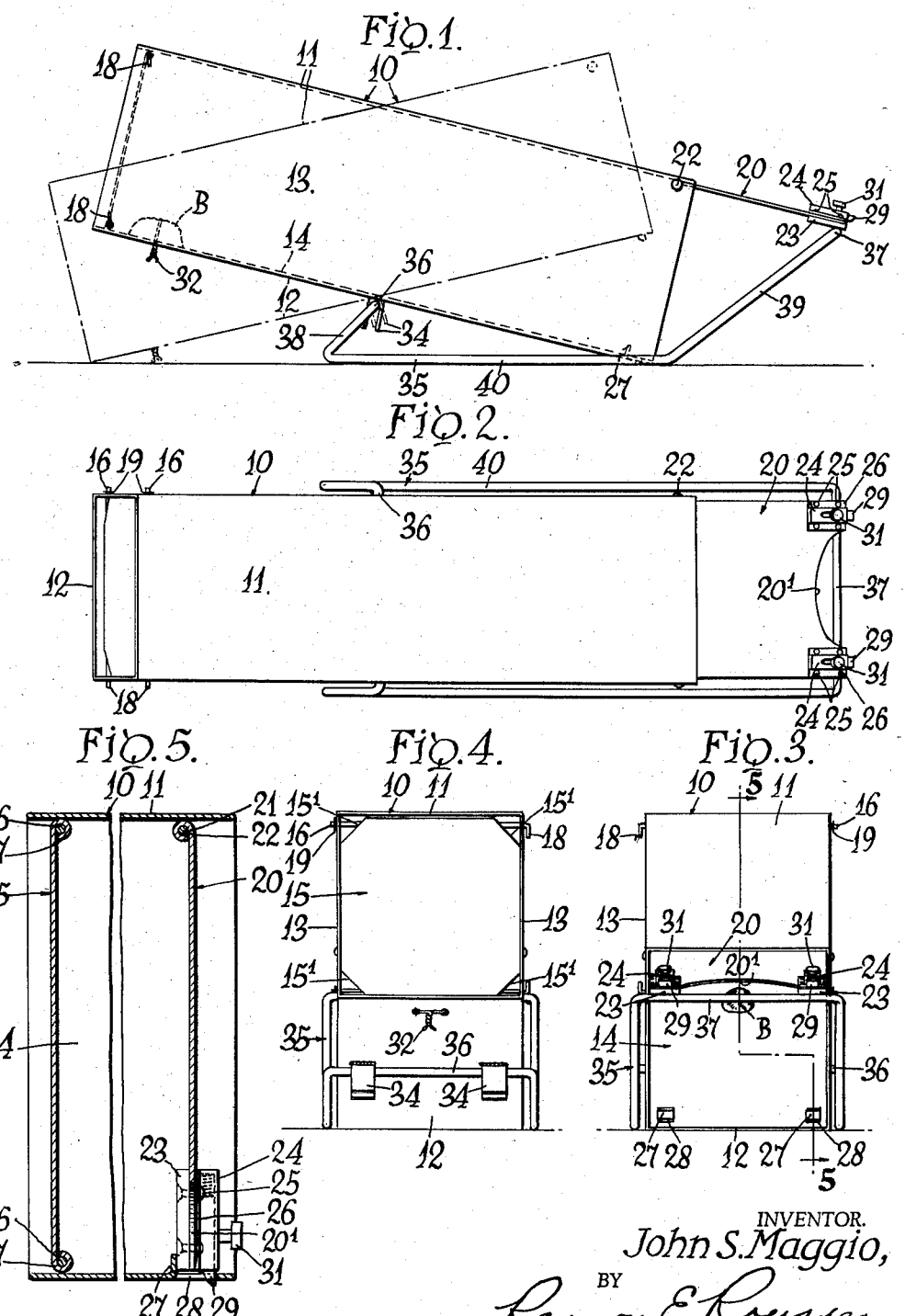

2,885,820

ANIMAL TRAP

John S. Maggio, Buffalo, N.Y.

Application July 30, 1957, Serial No. 675,164

3 Claims. (Cl. 43—61)

My invention relates to improvements in traps for catching wild animals alive and uninjured.

Some animals are trapped to be destroyed, other animals are trapped primarily to get their pelts, while a large number of animals ranging from the largest to the smallest are trapped to be exhibited as specimens of their species.

Trapping of animals in traps which keep the animal alive and uninjured is not only more humane than trapping of animals in traps which may seriously injure and maim the animal but it is more practical to trap alive and uninjured animals which are trapped for their pelts, and of course animals which are trapped to be exhibited must be trapped alive and uninjured.

A great many prior traps are adapted to trap small animals alive and uninjured but most of the prior traps of which I am aware are open to the objection that they must be placed on a floor or some such comparatively hard and smooth surface to work properly, and while such traps are well adapted for trapping small animals such as mice and rats they are not adapted for trapping wild animals in their natural habitats.

The objects of my invention are to provide a trap construction which by simply varying the size of its component parts is adapted to trap alive and uninjured practically any animal regardless of its size and whether it is trapped for destruction, for its pelt or for exhibition purposes; to provide a trap construction which is adapted for use on practically any available ground irrespective of whether it is smooth and hard, or rough, uneven and soft; to provide a trap with a gate which is easy to set, which when released automatically and quickly closes and locks the trap without injuring the animal; and to provide a trap having a small number of simple component parts which, being adaptable to fabrication by mass production methods, may be provided cheaply and sold to users at a low cost.

In the drawing:

Figure 1 is a side elevational view of a trap constructed in accordance with the principles of my invention: Said trap being shown in its set position in full lines and in its locked position in dot and dash lines.

Figure 2 is a top plan view of the trap shown in Figure 1.

Figures 3 and 4 are end elevational views of the respective front and rear ends of my trap, and Figure 5 is an enlarged fragmentary vertical sectional view taken about on the line 5—5 of Fig. 3 but showing the gate closed and locked.

Referring now to the drawing it will be seen that the trap body 10, being preferably formed of suitable sheet material is formed with spaced and parallel top and bottom walls 11 and 12 respectively and side walls 13, which adjoin and provide a chamber 14. The dimensions of the chamber 14 are made suitable to the shape and size of the animal to be trapped therein.

The chamber 14 provides sufficient room for a trapped animal to be comfortable, but insufficient to allow it to injure itself in seeking to escape therefrom. A door 15 closes and is removably secured in one end of the chamber 14 by a pair of rods 16 carried by the side walls 13 and each rod is slidably fitted in one of the tubular upper and lower end portions 17 of the door 15.

The ends of the rods 16 extend through the side walls 13 and are removably retained in place by having one end bent to provide a handle 18 and by having the other end provided with a suitable removable element 19, so that upon removing their element 19 and grasping their handle 18 both of the rods 16 may be removed to allow the door 15 to be bodily removed or by removing one of the rods the door may be swung open by pivoting about the axis of the other rod.

The advantage of having the door removably and swingably mounted is to facilitate removal and transfer of a live wild animal from the chamber 14 to another enclosure: i.e. a suitable cage.

The other end of the chamber 14 is provided with a gate 20 which being loosely fitted between the top, bottom and side walls of the chamber, has its upper end formed with a tubular portion 21 mounted on a rod 22 carried by and secured to the side walls 13, so that it may be freely swung between the elevated and lowered positions shown in Figures 1 and 5. The inner side of the lower end of the gate 20 adjacent each of its side edges is provided with a block 23 and the outer side of the gate is provided with latches 24 each of which is alined with one of the blocks 23. A plurality of fastening devices such as the flat-top countersunk head rivets 25 pass through alined holes in the blocks, the gate and the flanges 26 of the latches 24 and are headed to secure the blocks and the latches to the gate.

The weight of the blocks 23 and the latches 24 is such that they reduce the time required to swing the gate from its elevated position to its lowered position, and to insure that the gate stops in a predetermined position to close the chamber 14, the bottom wall 12 of the chamber is provided with the stops 27 against which the blocks 23 engage to stop the swinging motion of the gate. The stops 27 may be conveniently formed as a part of the bottom wall, as shown in Figure 5, thus providing the openings 28 in which the spring actuated parts 29 of the latch 24 automatically and simultaneously engage to lock the gate when it reaches its chamber closing lowered position. To unlock the gate for movement to its elevated position each spring actuated part 29 is provided with a finger piece 31 operable to withdraw the part 29 from engagement with the associated opening 28.

The trap body 10, is provided with a suitable animal bait B which is located within the chamber 14 adjacent its door end by any suitable means which may be like the bait securing means 32 shown in Figures 1 and 4.

To mount the body 10 to perform its live animal trapping function, its bottom wall 12 is provided with a pair of transversely alined spaced inverted U-shaped clips 34 located slightly closer to the gate end than to the door end so that when the clips are engaged and supported upon a transverse fulcrum and the gate is supported in its elevated position the body normally rests in the full line position of Figure 1.

An important feature of my invention resides in providing a chassis which is adapted for use on the different types of ground found in the natural habitat of wild animals, and which is not only formed with a fulcrum for rockably supporting the body 10 for movement between tilted set and locked positions but is also formed to support the door 15 in its set position.

The chassis 35, at least for traps for small to medium size animals is preferably constructed from a single continuous rod formed to provide a straight transverse fulcrum bar 36 for rockably supporting the body 10 and a straight transverse bar 37 spaced from and parallel to the bar 36 for supporting the gate 20 in its elevated set position. The opposite ends of the bars 36 and 37 are connected together by side members 38 and 39 formed as forwardly and upwardly inclined extensions of base forming members 40, and the ends of the rod are joined to complete the chassis.

Assuming that the trap is baited and set as shown in full lines in Figure 1, when an animal enters the chamber 14 and moves toward the bait B sufficiently to cause the body 10 to move toward the broken line position of Figure 1 the weighted gate 20 slides off the bar 37 and quickly swings to its locked position thereby trapping the animal. It will be noted that only a fraction of the entire rocking movement of the body 10 in a counterclockwise direction as seen in Figure 1 is required to cause the gate to slide off the bar 37 so that it swings down and locks the animal in the chamber 14 before it has a chance to retreat.

The bottom edge of the gate 20 may be relieved as at 20' to provide space for an animal's tail to prevent injuring it and the space 20' together with the cutaway corners 15' of the door 15 provide ample ventilation for the trapped animal.

It should be understood that the herein shown and described form of my invention is intended to exemplify its principles and that various modifications and rearrangement of the component parts of my trap may be made within the scope of appended claims, wherein I claim:

1. A trap construction adaptable for trapping different sizes of animals alive and uninjured comprising a unitary trap body supporting chassis frame formed with spaced substantially parallel base bars adapted to support the trap upon different types of surfaces, said bars having their rear and front ends bent upwardly and forwardly and respectively connected together by a transverse fulcrum bar and a transverse gate supporting bar, a trap body having substantially parallel top and bottom walls and parallel side walls spaced to provide a rectangular chamber of a size suitable to the size of the animal to be trapped, a door removably secured in the rear end of the body to normally close the rear end of the chamber and to allow removal of a trapped animal therefrom, a gate having its top end pivotally secured in the front end of the body for swinging movement between an elevated chamber opening position and a lowered chamber closing position, a combined weight and latch means carried by the free end of the gate for causing the gate to swing from its elevated position and to latch in its lowered position quickly, clip means carried by the bottom wall of the body, said clip means being formed to receive the fulcrum bar and to rockably support the body thereon, and being located to normally cause the body to rock on the fulcrum bar to a forwardly and downwardly inclined set position, whereby upon the outer end of the gate being set upon the gate supporting bar the trap is set and upon an animal entering the body and causing it to rock slightly in a rearward and downward direction the gate slides off of its supporting bar and swings to and latches itself in its chamber closing position quickly, thereby trapping the animal in the chamber alive and uninjured.

2. A trap construction as set forth in claim 1 wherein the bottom wall of the body adjacent its front end is provided with a combined stop and latch receiving means for stopping and latching the gate in its chamber closing position to prevent escape of the trapped animal.

3. A trap construction as set forth in claim 1 wherein the door and the gate are formed to provide ample ventilation for the trapped animal and the free end of the gate is relieved to provide a space for a trapped animal's tail, thereby preventing injuring or damaging the animal's tail by and during swinging movement of the gate to its chamber closing position.

References Cited in the file of this patent
UNITED STATES PATENTS

| | | |
|---|---|---|
| 823,875 | Brandon | Apr. 25, 1899 |
| 1,286,898 | Ammen | Dec. 10, 1918 |
| 1,804,684 | Goodlet | May 12, 1931 |
| 2,485,319 | Rosen | Oct. 18, 1949 |